US012314070B2

(12) United States Patent
Shih et al.

(10) Patent No.: US 12,314,070 B2
(45) Date of Patent: May 27, 2025

(54) CIRCUIT LAYOUT FOR IMPROVING POWER SUPPLY REJECTION RATIO

(71) Applicant: REALTEK SEMICONDUCTOR CORPORATION, Hsinchu (TW)

(72) Inventors: Kuan-Yu Shih, Hsinchu (TW); Ying-Rong Su, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 239 days.

(21) Appl. No.: 18/209,156

(22) Filed: Jun. 13, 2023

(65) Prior Publication Data

US 2024/0094752 A1 Mar. 21, 2024

(30) Foreign Application Priority Data

Sep. 19, 2022 (TW) .................................. 111135340

(51) Int. Cl.
*H02M 3/335* (2006.01)
*G05F 1/46* (2006.01)
(Continued)

(52) U.S. Cl.
CPC .......... *G05F 1/467* (2013.01); *H01F 17/0006* (2013.01); *H01F 27/2804* (2013.01); *H01F 27/34* (2013.01)

(58) Field of Classification Search
CPC ...... G05F 1/467; H01F 27/34; H01F 27/2804; H01F 17/0006
(Continued)

(56) References Cited

U.S. PATENT DOCUMENTS 5,701,237 A * 12/1997 Yang ..................... H02M 3/335 363/16
6,812,919 B1 * 11/2004 Park ......................... G09G 1/04 345/212

(Continued)

FOREIGN PATENT DOCUMENTS

CN 105551777 A 5/2016
CN 110516481 A 11/2019

OTHER PUBLICATIONS

1) OA letter of a counterpart TW application (appl. No. 111135340) mailed on Feb. 8, 2023. 2) Summary of the TW OA letter in regard to the TW counterpart application: (1) Claims 1, 6, and 10 are rejected as being unpatentable over the cited reference 1 (CN105551777A). (2) Claims 2-5 and 7-9 are rejected as being unpatentable over the cited reference 1 in view of the cited reference 2 (CN110516481A). P.S. Correspondence between the claims of the TW counterpart application and the claims of the present US application: (1) Claims 1-5, 6-9, and 10 of the TW counterpart application are corresponding to the claims 1-5, 8-11, and 14 of the present US application respectively.

*Primary Examiner* — Yemane Mehari
(74) *Attorney, Agent, or Firm* — WPAT, PC

(57) ABSTRACT

A circuit layout for improving the power supply rejection ratio includes a radio frequency (RF) choke and an inductor. The RF choke receives a supply voltage and includes: a first choke coil positioned in an ultra-thick metal (UTM) layer, the coil including a first choke electrode; and a second choke coil positioned in a redistribution layer (RDL), the coil including a second choke electrode. The inductor belongs to a main circuit and includes: a primary-side coil surrounding the first choke coil in the UTM layer, and being coupled to the first/second chock electrode and the main circuit's signal input circuit; and a secondary-side coil surrounding the first choke coil in the UTM layer and surrounding the second
(Continued)

choke coil in the RDL, and being used for signal output. The inductor and the RF choke jointly form mutual induction to suppress the noise of the supply voltage.

20 Claims, 8 Drawing Sheets

(51) Int. Cl.
*H01F 17/00* (2006.01)
*H01F 27/28* (2006.01)
*H01F 27/34* (2006.01)

(58) Field of Classification Search
USPC .......................................................... 323/270
See application file for complete search history.

(56) References Cited

U.S. PATENT DOCUMENTS

| | | | | |
|---|---|---|---|---|
| 10,438,735 | B2 * | 10/2019 | Zhang | H01F 27/2804 |
| 2016/0118180 | A1 * | 4/2016 | Chen | H01F 21/12 336/170 |
| 2019/0051440 | A1 * | 2/2019 | Ueki | H01F 17/00 |
| 2023/0395317 | A1 * | 12/2023 | Hollis | H01F 27/306 |

* cited by examiner

CIRCUIT LAYOUT FOR IMPROVING POWER SUPPLY REJECTION RATIO

BACKGROUND OF THE INVENTION

1. Field of the Invention

The present disclosure relates to noise suppression, especially to a circuit layout for improving the power supply rejection ratio (PSRR).

2. Description of Related Art

A low dropout regulator (LDO) can linearly convert a power supply voltage into a regulated voltage suitable for an analog circuit. Ideally, the analog circuit expects the regulated voltage to be a pure direct current (DC) voltage. However, the power supply voltage contains alternating current (AC) noises, and thus the LDO should be able to suppress the AC noises of the power supply voltage. This noise suppression ability is represented by the power supply rejection ratio (PSRR). Due to the characteristics of a feedback system of the LDO, the PSRR of the LDO is usually not good under a high frequency band. Generally, the PSRR is very low (e.g., lower than 10 dB) under a frequency band above 1 GHz. In consideration of the above, finding a way to increase/improve the PSRR under a high frequency band (e.g., a radio frequency (RF) band) is important for this technical field.

SUMMARY OF THE INVENTION

An object of the present disclosure is to provide a circuit layout for improving the power supply rejection ratio (PSRR).

An embodiment of the circuit layout of the present disclosure includes a radio frequency (RF) choke and an inductor, wherein the inductor surrounds the RF choke. The RF choke includes a first choke coil and a second choke coil. The first choke coil is positioned in a first metal layer and includes a first choke electrode. The second choke coil is positioned in a second metal layer and includes a second choke electrode. The inductor belongs to a main circuit and includes a primary-side coil and a secondary-side coil. The primary-side coil includes a first primary-side coil, a second primary-side coil, a first primary-side electrode, and a second primary-side electrode. Both the first primary-side coil and the second primary-side coil are positioned in the first metal layer and surrounds the first choke coil; the first primary-side electrode is coupled with a choke positive electrode; and the second primary-side electrode is coupled with a signal input circuit of the main circuit. When the second choke electrode functions as the choke positive electrode, the first choke electrode functions as a choke negative electrode and is coupled with a voltage supply terminal; and when the first choke electrode functions as the choke positive electrode, the second choke electrode functions as the choke negative electrode and is coupled with the voltage supply terminal. The secondary-side coil includes a first secondary-side coil, a second secondary-side coil, a first secondary-side electrode, and a second secondary-side electrode. The first secondary-side coil is positioned in the first metal layer and surrounds the first choke coil; the second secondary-side coil is positioned in the second metal layer and surrounds the second choke coil; and both the first secondary-side electrode and the second secondary-side electrode are used for signal output. The RF choke and the inductor jointly form mutual induction to suppress a noise of a supply voltage of the voltage supply terminal.

Another embodiment of the circuit layout of the present disclosure includes an RF choke and an inductor, wherein the RF choke surrounds the inductor. The RF choke includes a first choke coil and a second choke coil. The first choke coil is positioned in a first metal layer, and includes a first choke electrode. The second choke coil is also positioned in the first metal layer, and includes a second choke electrode for being coupled with a voltage supply terminal. The inductor belongs to a main circuit, and includes a primary-side coil and a secondary-side coil. The primary-side coil includes a first primary-side coil, a second primary-side coil, a first primary-side electrode, and a second primary-side electrode. Both the first primary-side coil and the second primary-side coil are positioned in the first metal layer and are surrounded by the first choke coil and the second choke coil; the first primary-side electrode is coupled with the first choke electrode; and the second primary-side electrode is coupled with a signal input circuit of the main circuit. The secondary-side coil includes a first secondary-side coil, a second secondary-side coil, a first secondary-side electrode, and a second secondary-side electrode. The first secondary-side coil is positioned in the first metal layer and is surrounded by the first choke coil and the second choke coil; the second secondary-side coil is positioned in a second metal layer; and both the first secondary-side electrode and the second secondary-side electrode are used for signal output. The RF choke and the inductor jointly form mutual induction to suppress a noise of a supply voltage of the voltage supply terminal.

Another embodiment of the circuit layout includes an RF choke and an inductor, wherein the RF choke neighbors the inductor. The RF choke includes a first choke coil and a second choke coil. The first choke coil is positioned in a first metal layer, and includes a first choke electrode. The second choke coil is positioned in a second metal layer, and includes a second choke electrode for being coupled with a voltage supply terminal. The inductor belongs to a main circuit, and includes a primary-side coil and a secondary-side coil. The primary-side coil includes a first primary-side coil, a second primary-side coil, a first primary-side electrode, and a second primary-side electrode. Both the first primary-side coil and the second primary-side coil are positioned in the first metal layer. The first primary-side electrode is coupled with the first choke electrode; and the second primary-side electrode is coupled with a signal input circuit of the main circuit. The secondary-side coil includes a first secondary-side coil, a second secondary-side coil, a first secondary-side electrode, and a second secondary-side electrode. Both the first secondary-side electrode and the second secondary-side electrode are used for signal output. An interval between the secondary-side coil and the RF choke is determined according to a predetermined interval requirement so that the RF choke and the inductor jointly form mutual induction and thereby suppress a noise of a supply voltage of the voltage supply terminal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a circuit layout for improving the power supply rejection ratio (PSRR). This circuit layout can utilize electromagnetic induction between inductors to block alternating current (AC) signals, and thereby can improve the PSRR.

Figure 1:
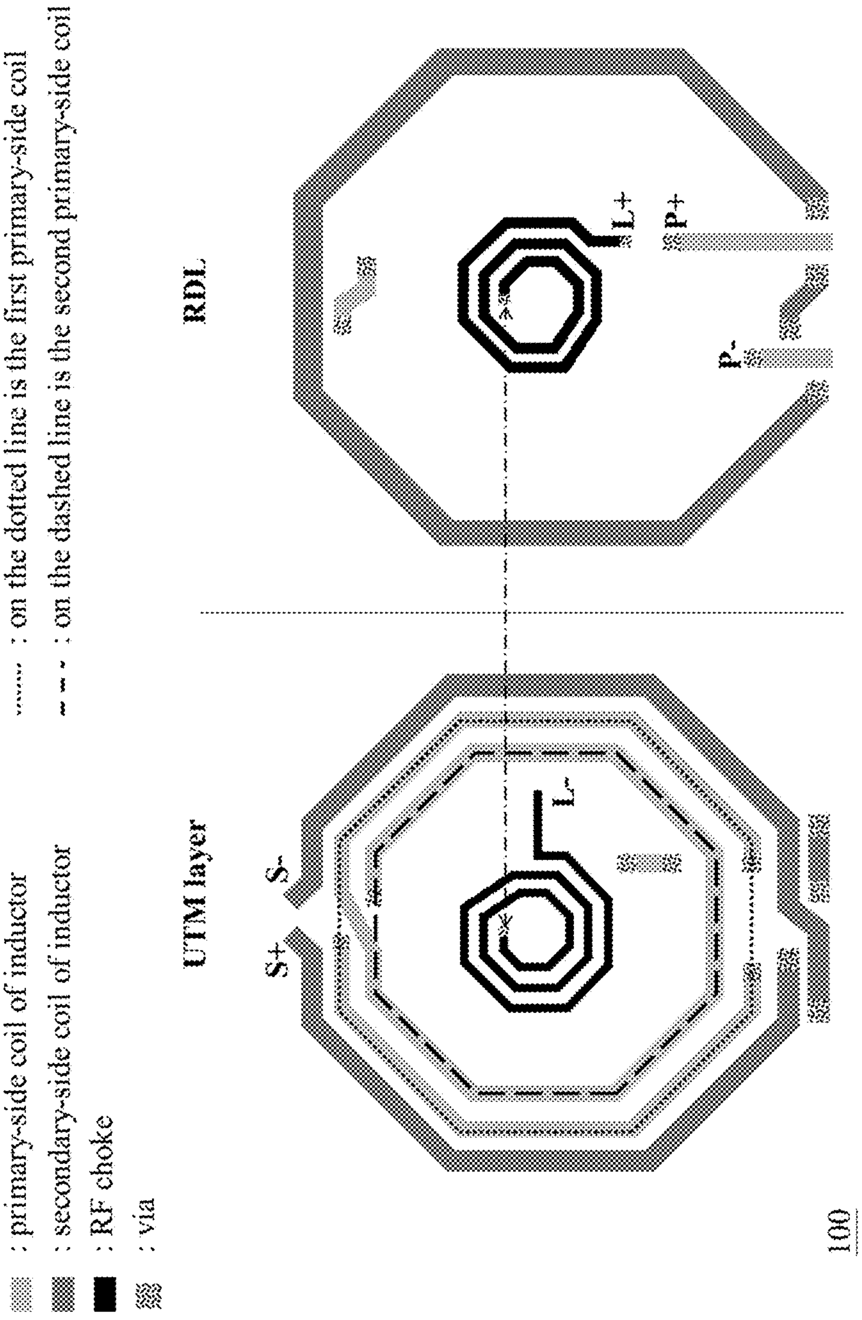
FIG. 1 shows an embodiment of the circuit layout of the present disclosure.
Figure 2:
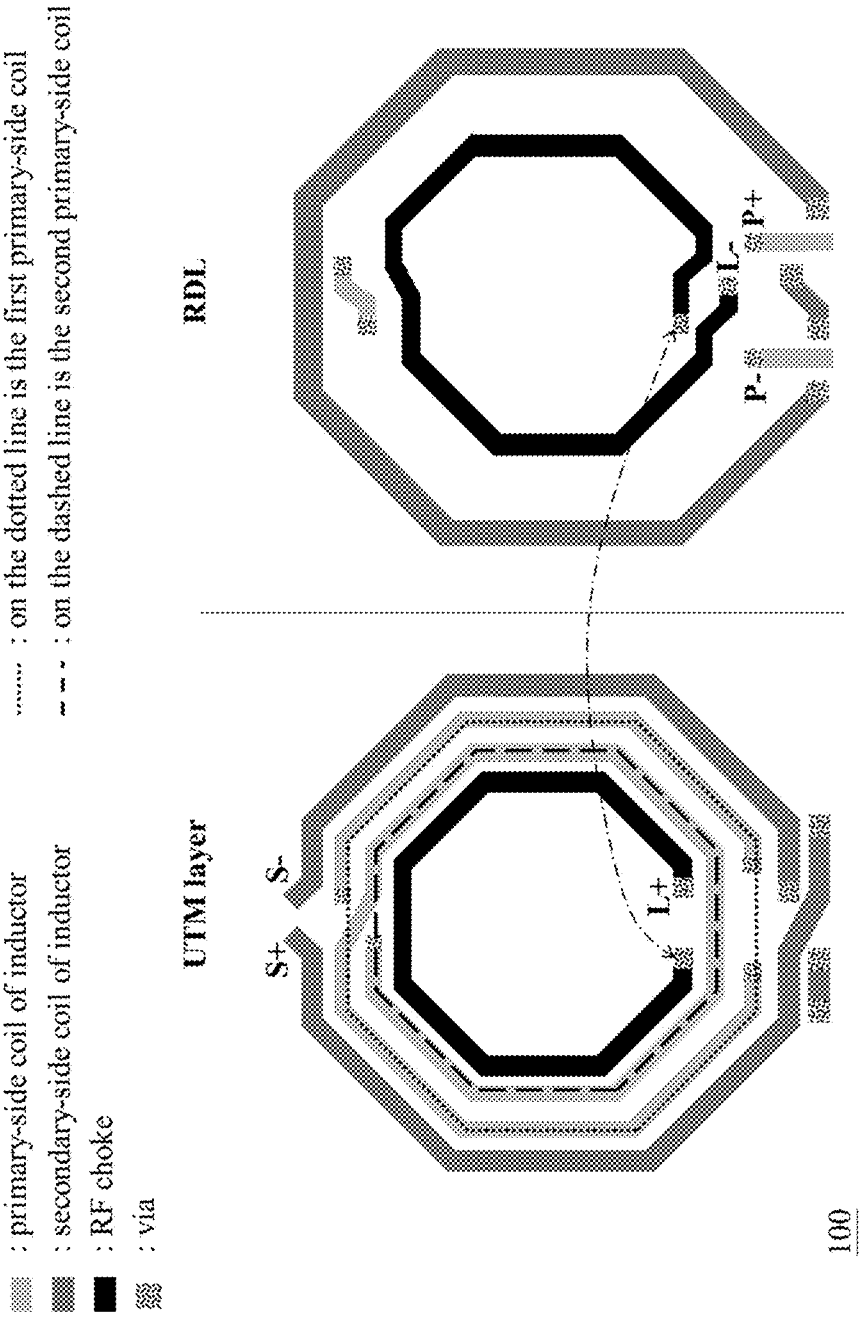
FIG. 2 shows a modification of the embodiment of FIG. 1.

FIG. 1 shows an embodiment of the circuit layout of the present disclosure. FIG. 2 shows a modification of the embodiment of FIG. 1. The circuit layout 100 in each of FIGS. 1~2 includes a radio frequency (RF) choke (i.e., the black coil in each of FIGS. 1~2) and an inductor (i.e., the dark gray coil and the light gray coil in each of FIGS. 1~2) (e.g., a balance-to-unbalance (Balun) inductor), wherein the inductor surrounds the RF choke so that the inductor and the RF choke jointly produce mutual induction to improve the PSRR. The RF choke includes a first choke coil and a second choke coil. The inductor belongs to a main circuit (e.g., a low noise amplifier (LNA)) (not shown in FIG. 1) and includes a primary-side coil and a secondary-side coil.

Referring to FIGS. 1~2, the first choke coil is positioned in a first metal layer (e.g., an ultra-thick metal (UTM) layer found in the semiconductor process filed), and includes a first choke electrode (i.e., "L−" in FIG. 1, or "L+" in FIG. 2). The second choke coil is positioned in a second metal layer (e.g., a redistribution layer (RDL) found in the semiconductor process filed), and includes a second choke electrode (i.e., "L+" in FIG. 1, or "L−" in FIG. 2). The first metal layer and the second metal layer are a UTM layer and an RDL respectively in the following description, but the implementation of the present embodiment is not limited thereto. It is noted that the UTM layer and the RDL are two layers (e.g., two adjoining layers) of an integrated circuit structure, and the coil(s) of one layer as a whole is substantially over the coil(s) of the other layer, but the implementation of the present invention is not limited thereto.

Referring to FIGS. 1~2, the primary-side coil includes a first primary-side coil (i.e., the coil on the dotted line in FIGS. 1~2, wherein the dotted line is an imaginary line for understanding) and a second primary-side coil (i.e., the coil on the dashed line in FIGS. 1~2, wherein the dashed line is an imaginary line for understanding) from the outside in, and includes a first primary-side electrode and a second primary-side electrode. The first primary-side electrode and the second primary-side electrode are a primary-side positive electrode P+ and a primary-side negative electrode P− respectively here. Both the first primary-side coil and the second primary-side coil are positioned in the UTM layer, and surround the first choke coil. The first primary-side positive electrode P+ is coupled with a choke positive electrode L+ (i.e., "L+" in FIGS. 1~2); the primary-side negative electrode P− is coupled with a signal input circuit (e.g., the transistor 530 and the transistor 540 that are respectively used for receiving $V_{BIAS}$ and $V_{IN}$ in FIGS. 5~8) (not shown in FIGS. 1~2) of the main circuit. As shown in FIG. 1, when the second choke electrode in the RDL functions as the choke positive electrode L+, the first choke electrode in the UTM layer functions as a choke negative electrode L− and is coupled with a voltage supply terminal (e.g., the output terminal 512 of the LDO 510 in FIG. 5; or the power supply terminal 501 for outputting a power supply voltage $V_{DD}$ in FIG. 6; or the output terminal 712 of the switch circuit 710 in FIG. 7; or the power supply terminal 501 for outputting a power supply voltage in FIG. 8). As shown in FIG. 2, when the first choke electrode in the UTM layer functions as the choke positive electrode L+, the second choke electrode functions as the choke negative electrode L− and is coupled with the voltage supply terminal.

Referring to FIGS. 1~2, the secondary-side coil includes a first secondary-side coil, a second secondary-side coil, a first secondary-side electrode, and a second secondary-side electrode, wherein the first secondary-side electrode and the second secondary-side electrode are a secondary-side positive electrode S+ and a secondary-side negative electrode S− respectively here. The first secondary-side coil is positioned in the UTM layer, and surrounds the first choke coil. The second secondary-side coil is positioned in the RDL, and surrounds the second choke coil. Both the secondary-side positive electrode S+ and the secondary-side negative electrode S− are coupled with a signal output circuit (not shown in the figures) of the main circuit for signal output.

It is noted that the first choke coil is coupled with the second choke coil through a via (i.e., the via for connecting the dotted block of the first choke coil and the dotted block of the second choke coil at the corresponding position in each of FIGS. 1~2, which is illustrated with a bivectorial dashed line), and the first secondary-side coil is coupled with the second secondary-side coil through another via (i.e., the via for connecting the dotted block of the first secondary-side coil and the dotted block of the second secondary-side coil at the corresponding position in each of FIGS. 1~2). Furthermore, the coupling coefficient of the mutual induction between the inductor and the RF choke is equal to or greater than 0.04. For example, the coupling coefficient of the mutual induction between the inductor and the RF choke approximates 0.16 in the embodiment of FIG. 1 (or 0.79 in the embodiment of FIG. 2), and this mutual induction can increase (or improve) the PSRR by 3.08 dB with respect to the noise frequency 5.2 GHz in the embodiment of FIG. 1 (or 8.02 dB in the embodiment of FIG. 2). In addition, any two electrodes at the corresponding positions (e.g., a positive electrode and its corresponding negative electrode) can exchange their roles, if practicable.

Figure 3:
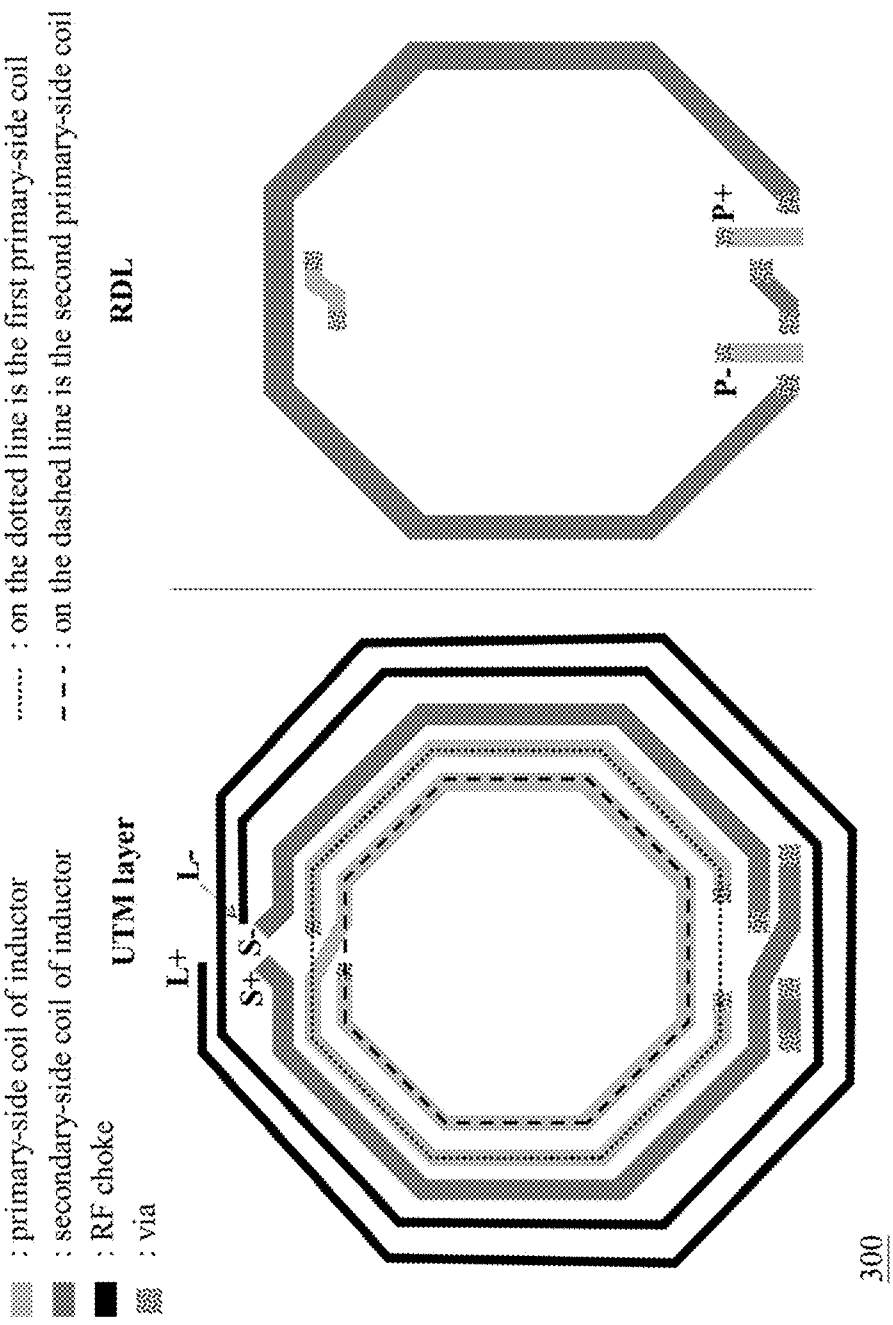
FIG. 3 shows another embodiment of the circuit layout of the present disclosure.

FIG. 3 shows another embodiment of the circuit layout of the present disclosure. The circuit layout 300 in FIG. 3 includes an RF choke (i.e., the black coil in FIG. 3) and an inductor (i.e., the dark gray coil and the light gray coil in FIG. 3), wherein the RF choke surrounds the inductor so that the RF choke and the inductor jointly form mutual induction to improve the PSRR. The RF choke includes a first choke coil and a second choke coil from the outside in. The inductor belongs to a main circuit (e.g., an LNA), and includes a primary-side coil and a secondary-side coil. It is noted that the first choke coil and the second choke coil in FIG. 3 are a first part (e.g., the outer round) of a continuous coil and a second part (e.g., the inner round) of the continuous coil respectively, but the implementation of the present invention is not limited thereto.

Referring to FIG. 3, the first choke coil is positioned in a first metal layer (e.g., a UTM layer) and includes a first choke electrode, wherein the first choke electrode is a choke positive electrode L+ in this embodiment. The second choke coil is also positioned in the first metal layer and includes a second choke electrode, wherein the second choke electrode is a choke negative electrode L− and is coupled with a voltage supply terminal. The first metal layer is a UTM layer in the following description, but the implementation of the present embodiment is not limited thereto.

Referring to FIG. 3, the primary-side coil includes a first primary-side coil (i.e., the coil on the dotted line in FIG. 3) and a second primary-side coil (i.e., the coil on the dashed line in FIG. 3) from the outside in, and includes a first primary-side electrode and a second primary-side electrode. The first primary-side electrode and the second primary-side electrode function as a primary-side positive electrode P+ and a primary-side negative electrode P− respectively here. Both the first primary-side coil and the second primary-side coil are positioned in the UTM layer, and are surrounded by the first choke coil and the second choke coil. The primary-side positive electrode P+ is coupled with the choke positive electrode L+ while the primary-side negative electrode P− is coupled with a signal input circuit (e.g., the transistor 530 and the transistor 540 that are respectively used for receiving $V_{BIAS}$ and $V_{IN}$ in FIGS. 5~8) (not shown in FIG. 3) of the main circuit. It is noted that although FIG. 3 does not show how the primary-side positive electrode P+ is coupled to the choke positive electrode L+, people having ordinary skill in the art can implement the above-mentioned coupling based on the disclosure of FIGS. 1~2 and the knowledge in this technical field.

Referring to FIG. 3, the secondary-side coil includes a first secondary-side coil, a second secondary-side coil, a first secondary-side electrode, and a second secondary-side electrode, wherein the first second-side electrode and the second secondary-side electrode function as a secondary-side positive electrode S+ and a secondary-side negative electrode S-respectively here. The first secondary-side coil is positioned in the UTM layer, and is surrounded by the first choke coil and the second choke coil. The second secondary-side coil is positioned in a second metal layer (e.g., an RDL). Both the secondary-side positive electrode S+ and the secondary-side negative electrode S− are coupled with a signal output circuit (not shown in the figures) of the main circuit for signal output. The coupling coefficient of the mutual induction between the inductor and the RF choke is equal to or greater than 0.04. For example, the coupling coefficient of the mutual induction between the inductor and the RF choke approximates 0.39 in the embodiment of FIG. 3, and this mutual induction can increase (or improve) the PSRR by 5.61 dB with respect to the noise frequency 5.2 GHz.

Since those having ordinary skill in the art can refer to the disclosure of the embodiments of FIGS. 1~2 to appreciate the detail and modification of the embodiment of FIG. 3, repeated and redundant description is omitted here.

Figure 4:
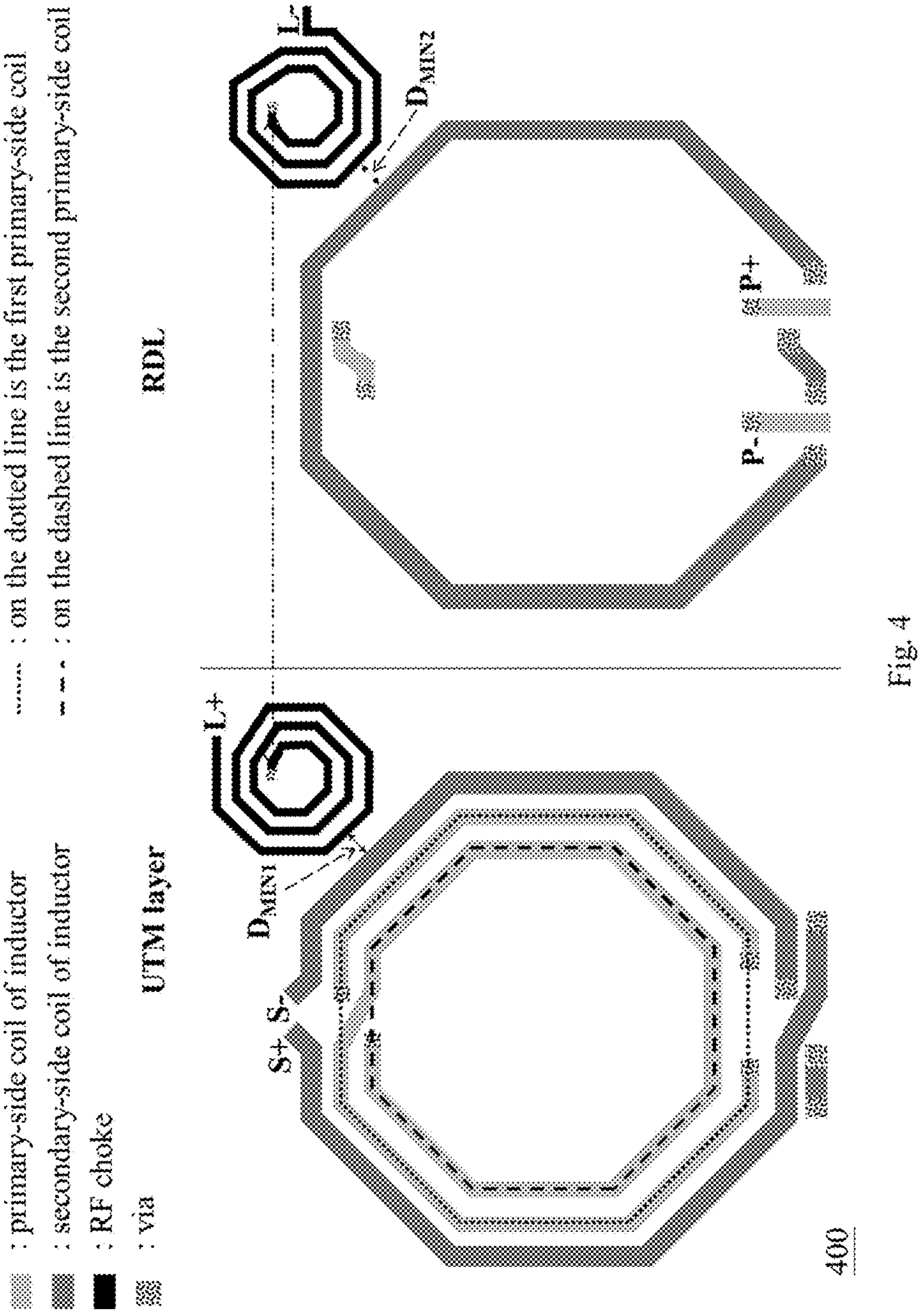
FIG. 4 shows yet another embodiment of the circuit layout of the present disclosure.

FIG. 4 shows another embodiment of the circuit layout of the present disclosure. The circuit layout 400 of FIG. 4 includes an RF choke (i.e., the black coil in FIG. 4) and an inductor (i.e., the dark gray coil and the light gray coil in FIG. 4), wherein the RF choke is next to the inductor so that the RF choke and the inductor jointly produce mutual induction to improve the PSRR. The RF choke includes a first choke coil and a second choke coil. The inductor belongs to a main circuit (e.g., an LNA) and includes a primary-side coil and a secondary-side coil.

Referring to FIG. 4, the first choke coil is positioned in a first metal layer (e.g., a UTM layer) and includes a first choke electrode, wherein the first choke electrode is a choke positive electrode L+ in this embodiment. The second choke coil is positioned in a second metal layer (e.g., an RDL) and includes a second choke electrode, wherein the second choke electrode is a choke negative electrode L− and is coupled with a voltage supply terminal in this embodiment. The first metal layer and the second metal layer are a UTM layer and an RDL respectively in the following description, but the implementation of the present embodiment is not limited thereto.

Referring to FIG. 4, the primary-side coil includes a first primary-side coil (i.e., the coil on the dotted line in FIG. 4) and a second primary-side coil (i.e., the coil on the dashed line in FIG. 4) from the outside in, and includes a first primary-side electrode and a second primary-side electrode. The first primary-side electrode and the second primary-side electrode function as a primary-side positive electrode P+ and a primary-side negative electrode P− here. Both the first primary-side coil and the second primary-side coil are positioned in the UTM layer and are close to the first choke coil. The primary-side positive electrode P+ is coupled with the choke positive electrode L+ while the primary-side negative electrode P− is coupled with a signal input circuit (e.g., the transistor 530 and the transistor 540 that are respectively used for receiving $V_{BIAS}$ and $V_{IN}$ in FIGS. 5~8) (not shown in FIG. 4) of the main circuit.

Referring to FIG. 4, the secondary-side coil includes a first secondary-side coil, a second secondary-side coil, a first secondary-side electrode, and a second secondary-side electrode, wherein the first secondary-side electrode and the second secondary-side electrode function as a secondary-side positive electrode S+ and a secondary-side negative electrode S-here. The first secondary-side coil is positioned in the UTM layer while the minimum interval $D_{MIN1}$ between the first secondary-side coil and the first choke coil is not greater than a first predetermined interval. The second secondary-side coil is positioned in the RDL while the minimum interval $D_{MIN2}$ between the second secondary-side coil and the second choke coil is not greater than a second predetermined interval. The minimum interval $D_{MIN1}$ can be the same as or different from the minimum interval $D_{MIN2}$, and the first predetermined interval can be the same as or different from the second predetermined interval. The first and second predetermined intervals may vary with the process for manufacturing the circuit layout 400. For example, when the process for manufacturing the circuit layout 400 is a 55/40/28/22 nanometer (nm) CMOS process, both the first predetermined interval and the second predetermined interval are not greater than 4 μm; however, the implementation of the present invention is not limited to the above features. Both the secondary-side positive electrode S+ and the secondary-side negative electrode S− are coupled with a signal output circuit (not shown) of the main circuit for signal output. The coupling coefficient of the mutual induction between the inductor and the RF choke is equal to or greater than 0.04. For example, the coupling coefficient of the mutual induction between the inductor and the RF choke is 0.04 in the embodiment of FIG. 4, and this mutual induction can increase (or improve) the PSRR by 0.7 dB with respect to the noise frequency 5.2 GHz.

Since those having ordinary skill in the art can refer to the disclosure of the embodiments of FIGS. 1~3 to appreciate the detail and modification of the embodiment of FIG. 4, repeated and redundant description is omitted here.

Figure 5:
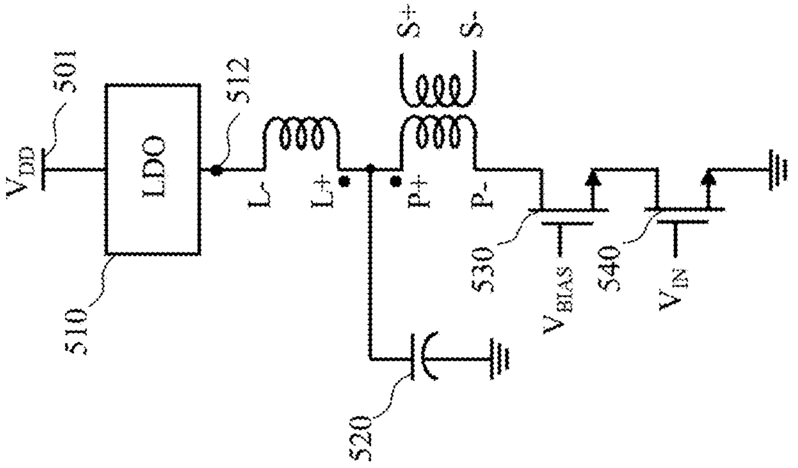
FIG. 5 shows an exemplary implementation using any of the circuit layouts of FIGS. 1~4.

FIG. 5 shows an exemplary implementation using any of the circuit layouts of FIGS. 1~4. FIG. 5 includes a low dropout regulator (LDO) 510, a capacitor 520, a cascode transistor 530, and an input transistor 540. The LDO 510 is coupled between a power supply terminal 501 and the voltage supply terminal (i.e., a connection node of the choke negative electrode L−), that is to say the output terminal 512 of the LDO 510 here, and the LDO 510 is configured to output a regulated voltage to the choke negative electrode L− according to a power supply voltage $V_{DD}$ of the power supply terminal 501. The capacitor 520 includes a first capacitor terminal and a second capacitor terminal, wherein: the first capacitor terminal is coupled with the choke positive electrode L+ and the primary-side positive electrode P+, and the second capacitor terminal is coupled with a lower voltage terminal (e.g., a ground terminal). The cascode transistor 530 is configured to operate according to a bias $V_{BIAS}$ which is determined according to the demand for implementation. The input transistor 540 is configured to receive an input signal $V_{IN}$ and operate accordingly. It is noted that at least one of the LDO 510, the capacitor 520, the cascode transistor 530, and the input transistor 540 can be included in the circuit layout of the present disclosure or be set outside the circuit layout of the present disclosure. It is also noted that the RF choke (i.e., the choke including the electrodes L+ and L−) and the inductor (i.e., the inductor including the electrodes P+, P−, S+, and S−) jointly form mutual induction, which is illustrated with the two corresponding black dots marked on the positions next to the electrodes L+ and P+.

Figure 6:
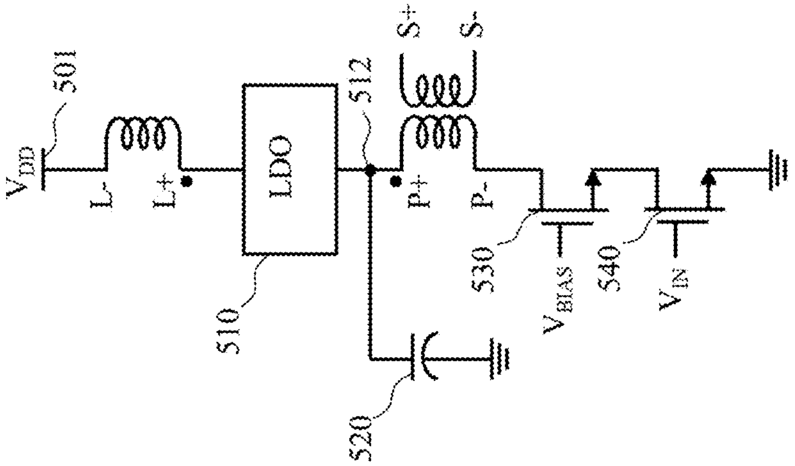
FIG. 6 shows another exemplary implementation using any of the circuit layouts of FIGS. 1~4.

FIG. 6 shows another exemplary implementation using any of the circuit layouts of FIGS. 1~4. Compared with FIG. 5, the two electrodes L− and L+ of the RF choke in FIG. 6 are coupled between the power supply terminal 501 and the LDO 510 while the LDO 510 is coupled between the choke positive electrode L+ and the primary-side positive electrode P+.

Figure 7:
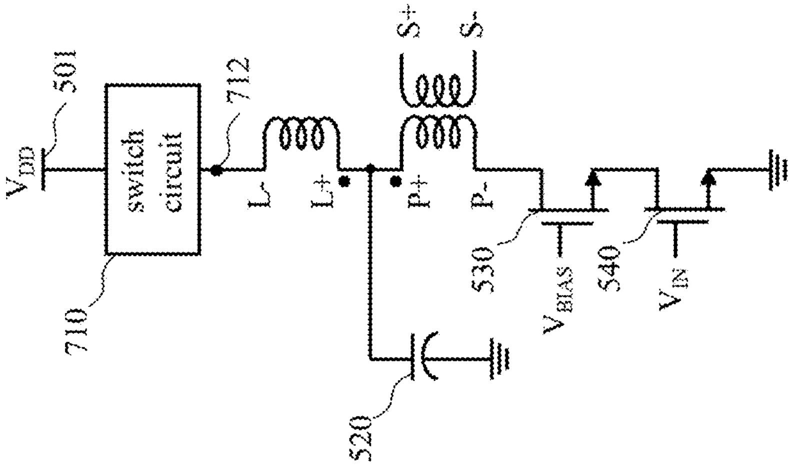
FIG. 7 shows yet another exemplary implementation using any of the circuit layouts of FIGS. 1~4.

FIG. 7 shows yet another exemplary implementation using any of the circuit layouts of FIGS. 1~4. Compared with FIG. 5, FIG. 7 uses a switch circuit 710 instead of the LDO 510, wherein the switch circuit 710 is coupled between the power supply terminal 501 and the output terminal 712 of the switch circuit 710. It is noted that the switch circuit 710 can be included in the circuit layout of the present disclosure or be set outside the circuit layout of the present disclosure in accordance with the demand for implementation. It is also noted that the switch circuit 710 is configured to output or stop outputting the power supply voltage $V_{DD}$ of the power supply terminal 501 to the output terminal 712 according to a switch signal.

Figure 8:
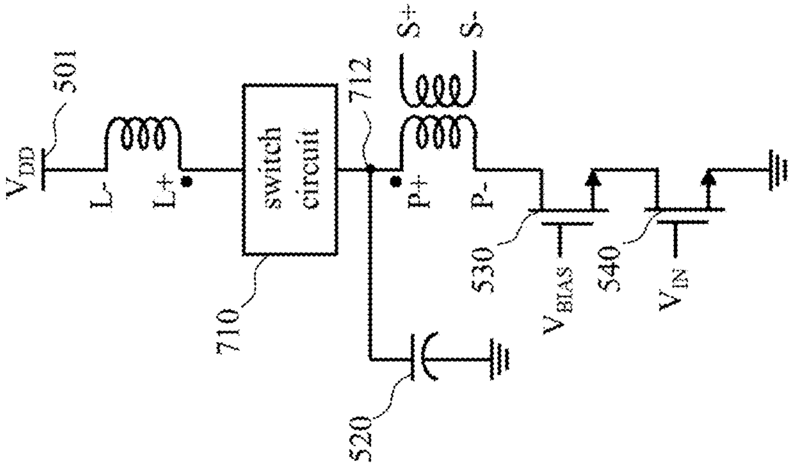
FIG. 8 shows yet another exemplary implementation using any of the circuit layouts of FIGS. 1~4.

FIG. 8 shows yet another exemplary implementation using any of the circuit layouts of FIGS. 1~4. Compared with FIG. 7, the two electrodes L− and L+ of the RF choke in FIG. 8 are coupled between the power supply terminal 501 and the switch circuit 710 while the switch circuit 710 is coupled between the choke positive electrode L+ and the primary-side positive electrode P+.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the circuit layout of the present disclosure can utilize the mutual induction between an RF choke and an inductor to block AC noises and thereby improve the PSRR.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A circuit layout for improving a power supply rejection ratio (PSRR), the circuit layout comprising:

a radio frequency (RF) choke including:

a first choke coil positioned in a first metal layer, the first choke coil including a first choke electrode; and a second choke coil positioned in a second metal layer, the second choke coil including a second choke electrode; and an inductor of a main circuit, the inductor including:

a primary-side coil including a first primary-side coil, a second primary-side coil, a first primary-side electrode, and a second primary-side electrode, wherein: both the first primary-side coil and the second primary-side coil are positioned in the first metal layer and surrounds the first choke coil; the first primary-side electrode is coupled with a choke positive electrode; the second primary-side electrode is coupled with a signal input circuit of the main circuit; when the second choke electrode functions as the choke positive electrode, the first choke electrode functions as a choke negative electrode and is coupled with a voltage supply terminal; and when the first choke electrode functions as the choke positive electrode, the second choke electrode functions as the choke negative electrode and is coupled with the voltage supply terminal; and a secondary-side coil including a first secondary-side coil, a second secondary-side coil, a first secondary-side electrode, and a second secondary-side electrode, wherein: the first secondary-side coil is positioned in the first metal layer and surrounds the first choke coil; the second secondary-side coil is positioned in the second metal layer and surrounds the second choke coil; and both the first secondary-side electrode and the second secondary-side electrode are used for signal output, wherein the RF choke and the inductor jointly form mutual induction to suppress a noise of a supply voltage of the voltage supply terminal.

2. The circuit layout of claim 1, further comprising:

a low dropout regulator (LDO) coupled between a power supply terminal and the voltage supply terminal, and configured to output a regulated voltage to the voltage supply terminal according to a power supply voltage of the power supply terminal; and a capacitor including a first capacitor terminal and a second capacitor terminal, wherein the first capacitor terminal is coupled with the choke positive electrode and the first primary-side electrode, and the second capacitor terminal is coupled with a low voltage terminal.

3. The circuit layout of claim 1, further comprising a low dropout regulator (LDO) and a capacitor, wherein:

the first primary-side electrode is coupled with the choke positive electrode through the LDO;

the LDO is coupled between the choke positive electrode and the first primary-side electrode, and configured to output a regulated voltage to a voltage output terminal according to a voltage of the choke positive electrode; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

4. The circuit layout of claim 1, further comprising:

a switch circuit coupled between a power supply terminal and the voltage supply terminal, and configured to output or stop outputting a power supply voltage of the power supply terminal to the voltage supply terminal according to a switch signal; and a capacitor including a first capacitor terminal and a second capacitor terminal, wherein the first capacitor terminal is coupled with the choke positive-terminal and the first primary-side electrode, and the second capacitor terminal is coupled with a low voltage terminal.

5. The circuit layout of claim 1, further comprising a switch circuit and a capacitor, wherein:

the first primary-side electrode is coupled with the choke positive electrode through the switch circuit;

the switch circuit is coupled between the choke positive electrode and the first primary-side electrode, and configured to output or stop outputting a voltage of the choke positive electrode to a voltage output terminal according to a switch signal; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

6. The circuit layout of claim 1, wherein the first metal layer is an ultra-thick metal (UTM) layer, the second metal layer is a redistribution layer (RDL), the first choke coil is coupled to the second choke coil through a via, and the first secondary-side coil is coupled to the second secondary-side coil through another via.

7. The circuit layout of claim 1, wherein a coupling coefficient of the mutual induction is equal to or greater than 0.04.

8. A circuit layout for improving a power supply rejection ratio (PSRR), the circuit layout comprising:

a radio frequency (RF) choke positioned in a first metal layer, the RF choke including a first choke electrode and a second choke electrode that is used for being coupled with a voltage supply terminal; and an inductor of a main circuit, the inductor including:

a primary-side coil including a first primary-side coil, a second primary-side coil, a first primary-side electrode, and a second primary-side electrode, wherein: both the first primary-side coil and the second primary-side coil are positioned in the first metal layer and are surrounded by the RF choke; the first primary-side electrode is coupled with the first choke electrode; and the second primary-side electrode is coupled with a signal input circuit of the main circuit; and a secondary-side coil including a first secondary-side coil, a second secondary-side coil, a first secondary-side electrode, and a second secondary-side electrode, wherein: the first secondary-side coil is positioned in the first metal layer and is surrounded by the RF choke; the second secondary-side coil is positioned in a second metal layer; and both the first secondary-side electrode and the second secondary-side electrode are used for signal output, wherein the RF choke and the inductor jointly form mutual induction to suppress a noise of a supply voltage of the voltage supply terminal.

9. The circuit layout of claim 8, further comprising:

a low dropout regulator (LDO) coupled between a power supply terminal and the voltage supply terminal, and configured to output a regulated voltage to the voltage supply terminal according to a power supply voltage of the power supply terminal; and a capacitor including a first capacitor terminal and a second capacitor terminal, wherein the first capacitor terminal is coupled with the first choke electrode and the first primary-side electrode, and the second capacitor terminal is coupled with a low voltage terminal.

10. The circuit layout of claim 8, further comprising a low dropout regulator (LDO) and a capacitor, wherein:

the first primary-side electrode is coupled with the first choke electrode through the LDO;

the LDO is coupled between the first choke electrode and the first primary-side electrode, and configured to output a regulated voltage to a voltage output terminal according to a voltage of the first choke electrode; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

11. The circuit layout of claim 8, further comprising:

a switch circuit coupled between a power supply terminal and the voltage supply terminal, and configured to output or stop outputting a power supply voltage of the power supply terminal to the voltage supply terminal according to a switch signal; and a capacitor including a first capacitor terminal and a second capacitor terminal, wherein the first capacitor terminal is coupled with the first choke electrode and the first primary-side electrode, and the second capacitor terminal is coupled with a low voltage terminal.

12. The circuit layout of claim 8, further comprising a switch circuit and a capacitor, wherein:

the first primary-side electrode is coupled with the first choke electrode through the switch circuit;

the switch circuit is coupled between the first choke electrode and the first primary-side electrode, and configured to output or stop outputting a voltage of the first choke electrode to a voltage output terminal according to a switch signal; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

13. The circuit layout of claim 8, wherein the first metal layer is an ultra-thick metal (UTM) layer, the second metal layer is a redistribution layer (RDL), and the first secondary-side coil is coupled to the second secondary-side coil through a via.

14. A circuit layout for improving a power supply rejection ratio (PSRR), the circuit layout comprising:

a radio frequency (RF) choke including:

a first choke coil positioned in a first metal layer, the first choke coil including a first choke electrode; and a second choke coil positioned in a second metal layer, the second choke coil including a second choke electrode for being coupled with a voltage supply terminal; and an inductor of a main circuit, the inductor including:

a primary-side coil including a first primary-side coil, a second primary-side coil, a first primary-side electrode, and a second primary-side electrode, wherein: both the first primary-side coil and the second primary-side coil are positioned in the first metal layer; the first primary-side electrode is coupled with the first choke electrode; and the second primary-side electrode is coupled with a signal input circuit of the main circuit; and a secondary-side coil including a first secondary-side coil, a second secondary-side coil, a first secondary-side electrode, and a second secondary-side electrode, wherein both the first secondary-side electrode and the second secondary-side electrode are used for signal output, wherein an interval between the secondary-side coil and the RF choke is determined according to a predetermined interval requirement so that the RF choke and the inductor jointly form mutual induction and thereby suppress a noise of a supply voltage of the voltage supply terminal.

15. The circuit layout of claim 14, further comprising:

a low dropout regulator (LDO) coupled between a power supply terminal and the voltage supply terminal, and configured to output a regulated voltage to the second choke electrode according to a power supply voltage of the power supply terminal; and a capacitor including a first capacitor terminal and a second capacitor terminal, wherein the first capacitor terminal is coupled with the first choke electrode and the first primary-side electrode, and the second capacitor terminal is coupled with a low voltage terminal.

16. The circuit layout of claim 14, further comprising a low dropout regulator (LDO) and a capacitor, wherein:

the first primary-side electrode is coupled with the first choke electrode through the LDO;

the LDO is coupled between the first choke electrode and the first primary-side electrode, and configured to output a regulated voltage to a voltage output terminal according to a voltage of the first choke electrode; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

17. The circuit layout of claim 14, further comprising:

a switch circuit coupled between a power supply terminal and the voltage supply terminal, and configured to output or stop outputting a power supply voltage of the power supply terminal to the voltage supply terminal according to a switch signal; and a capacitor including a first capacitor terminal and a second capacitor terminal, wherein the first capacitor terminal is coupled with the first choke electrode and the first primary-side electrode, and the second capacitor terminal is coupled with a low voltage terminal.

18. The circuit layout of claim 14, further comprising a switch circuit and a capacitor, wherein:

the first primary-side electrode is coupled with the first choke electrode through the switch circuit;

the switch circuit is coupled between the first choke electrode and the first primary-side electrode, and configured to output or stop outputting a voltage of the first choke electrode to a voltage output terminal according to a switch signal; and the capacitor includes a first capacitor terminal and a second capacitor terminal, wherein the first capacitor terminal is coupled with the voltage output terminal and the first primary-side electrode, and the second capacitor terminal is coupled with a low voltage terminal.

19. The circuit layout of claim 14, wherein the first metal layer is an ultra-thick metal (UTM) layer, the second metal layer is a redistribution layer (RDL), the first choke coil is coupled to the second choke coil through a via, and the first secondary-side coil is coupled to the second secondary-side coil through another via.

20. The circuit layout of claim 14, wherein: the first secondary-side coil is positioned in the first metal layer; a minimum interval between the first secondary-side coil and the first choke coil is not greater than 4 μm to fill the predetermined interval requirement; the second secondary-side coil is positioned in the second metal layer; and a minimum interval between the second secondary-side coil and the second choke coil is not greater than 4 μm to fill the predetermined interval requirement.

* * * * *